(12) United States Patent
Wang et al.

(10) Patent No.: US 11,493,326 B2
(45) Date of Patent: Nov. 8, 2022

(54) OBJECT SURFACE DATA DETECTION METHOD AND SYSTEM, ELECTRONIC APPARATUS, AND STORAGE MEDIUM

(71) Applicant: SCANTECH (HANGZHOU) CO., LTD., Hangzhou (CN)

(72) Inventors: Jiangfeng Wang, Hangzhou (CN); Qiang Zhou, Hangzhou (CN); Shangjian Chen, Hangzhou (CN); Jun Zheng, Hangzhou (CN)

(73) Assignee: SCANTECH (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 17/683,119

(22) Filed: Feb. 28, 2022

(65) Prior Publication Data
US 2022/0252385 A1 Aug. 11, 2022

Related U.S. Application Data

(63) Continuation of application No. PCT/CN2021/081584, filed on Mar. 18, 2021.

(30) Foreign Application Priority Data

Feb. 5, 2021 (CN) .......................... 202110170149.4

(51) Int. Cl.
G01B 11/00 (2006.01)
G01B 11/25 (2006.01)
G06T 7/70 (2017.01)

(52) U.S. Cl.
CPC ........ G01B 11/005 (2013.01); G01B 11/2522 (2013.01); G06T 7/70 (2017.01)

(58) Field of Classification Search
CPC ...... G01B 11/005; G01B 11/2522; G06T 7/70
See application file for complete search history.

(56) References Cited

U.S. PATENT DOCUMENTS

| 7,058,213 B2 | 6/2006 | Rubbert et al. |
| 7,305,110 B2 | 12/2007 | Rubbert et al. |

(Continued)

FOREIGN PATENT DOCUMENTS

| CN | 106846488 A | 6/2017 |
| CN | 106918300 A | 7/2017 |

(Continued)

OTHER PUBLICATIONS

Office Action issued in Chinese Application No. 202110170149.4, dated Jul. 9, 2021 (24 pages).

(Continued)

*Primary Examiner* — Rebecca C Bryant
(74) *Attorney, Agent, or Firm* — Osha Bergman Watanabe & Burton LLP

(57) ABSTRACT

An object surface data detection method and system, an electronic apparatus, and a storage medium. The object surface data detection method, applied to a three-dimensional scanning system comprising detection auxiliary devices and a scanning device, includes: obtaining a unified coordinate system established for the detection auxiliary devices, wherein a number of the detection auxiliary devices is at least two; respectively obtaining first scan data of the scanning device scanning a surface of an object and tracking results of the detection auxiliary devices tracking the scanning device; and comprehensively calculating the tracking results, the first scan data, and the unified coordinate system to obtain an object surface detection result.

30 Claims, 4 Drawing Sheets

(56) References Cited

U.S. PATENT DOCUMENTS

2001/0038705 A1 11/2001 Rubbert et al.
2005/0089214 A1 4/2005 Rubbert et al.
2006/0228010 A1 10/2006 Rubbert et al.

FOREIGN PATENT DOCUMENTS

| | | | |
|---|---|---|---|
| CN | 107003123 A | | 8/2017 |
| CN | 108759669 A | | 11/2018 |
| CN | 108801142 A | | 11/2018 |
| CN | 109000582 A | | 12/2018 |
| CN | 109238168 A | | 1/2019 |
| CN | 109410320 A | | 3/2019 |
| CN | 110340886 A | | 10/2019 |
| CN | 111879235 A | | 11/2020 |
| CN | 113218303 A | * | 8/2021 |
| EP | 0330202 A2 | | 8/1989 |
| JP | 2018022247 A | | 2/2018 |
| KR | 20160006441 A | | 1/2016 |

OTHER PUBLICATIONS

International Search Report Issued in PCT Application No. PCT/CN2021/081584, dated Feb. 5, 2021, 5 pages.
Written Opinion Issued in PCT Application No. PCT/CN2021/081584, dated Feb. 5, 2021, 4 pages.
Zhou, "Study on Large Section Geometric Shape Vision Measurement System," College of Precision Instrument and Dpto-electronics Engineering, Tianjin University, Jul. 2006, 114 pages.

* cited by examiner

OBJECT SURFACE DATA DETECTION METHOD AND SYSTEM, ELECTRONIC APPARATUS, AND STORAGE MEDIUM

CROSS-REFERENCE TO RELATED APPLICATIONS

The present application is a continuation application of PCT Application No. PCT/CN2021/081584, filed on Mar. 18, 2021, which claims priority to Chinese Patent Application No. 202110170149.4, filed on Feb. 5, 2021. The entire contents of these applications are incorporated herein by reference.

FIELD OF THE INVENTION

The present application relates to the field of vision measurement technology, in particular to an object surface data detection method and system, an electronic apparatus, and a storage medium.

BACKGROUND OF THE INVENTION

The detection technology for object surface data has been widely applied in the fields of component size and position measurement, robot guidance, industrial design, defect detection, reverse engineering, etc., and is mainly used to scan the spatial shape, structure, and color of an object to obtain spatial coordinates of the surface of the object. In related technologies, tracking scanners are usually used to detect object surface data. The tracking scanner includes a tracking device and a scanning device, the tracking device is used to position a scanner, and the scanning device is used for object surface data detection. Therefore, the scanning range is limited to only the field of view that the tracking device can track, a larger object to be detected cannot be scanned, the scanning efficiency is low, and the scanning accuracy is also limited by the tracking device, resulting in low accuracy of object surface data detection.

Currently, no effective solution has been proposed for the problems of low efficiency and low accuracy of object surface data detection in related technologies.

SUMMARY OF THE INVENTION

Embodiments of the present application provide an object surface data detection method and system, an electronic apparatus, and a storage medium to at least solve the problem of low accuracy of object surface data detection in related technologies.

In a first aspect, embodiments of the present application provide an object surface data detection method, applied to a three-dimensional scanning system including detection auxiliary devices and a scanning device, the method including:

obtaining a unified coordinate system established for the detection auxiliary devices, wherein a number of the detection auxiliary devices is at least two;

respectively obtaining first scan data of the scanning device scanning a surface of an object and tracking results of the detection auxiliary devices tracking the scanning device; and comprehensively calculating the tracking results, the first scan data, and the unified coordinate system to obtain an object surface detection result.

In one embodiment, the comprehensively calculating the tracking results, the first scan data, and the unified coordinate system to obtain an object surface detection result includes:

in a case where the tracking results indicate that a number of tracked devices is at least two, selecting an optimal device from among all the tracked devices based on a preset selection strategy, wherein the tracked devices refer to the detection auxiliary devices that have successfully tracked the scanning device; and converting the first scan data to a tracking coordinate system of the optimal device to obtain second scan data, and converting the second scan data to the unified coordinate system to obtain the object surface detection result.

In one embodiment, the preset selection strategy includes at least one of the following: a distance-based strategy, a stitching precision-based strategy, and a marker number-based strategy.

In one embodiment, in the case where the tracking results indicate that the number of tracked devices is at least two, the method further includes:

obtaining a weight value corresponding to each of the tracked devices according to a positioning accuracy and a positioning state of each of the tracked devices;

converting the first scan data to a tracking coordinate system of each of the tracked devices to obtain frame scan data corresponding to the tracked device; and fusing all the frame scan data based on the weight values to obtain fused second scan data, thus obtaining the object surface detection result.

In one embodiment, the comprehensively calculating the tracking results, the first scan data, and the unified coordinate system to obtain an object surface detection result includes:

in a case where the tracking results indicate that a number of tracked devices is one, converting the first scan data to a tracking coordinate system of the tracked device to obtain second scan data, and converting the second scan data to the unified coordinate system to obtain the object surface detection result.

In one embodiment, obtaining tracking results of the detection auxiliary devices tracking the scanning device includes:

in a case where the tracking results indicate that a number of tracked devices is zero and the detection auxiliary devices are binocular tracking devices, combining monocular cameras obtained by splitting the binocular tracking devices, and then re-obtaining the tracking results by using the monocular cameras.

In one embodiment, the obtaining a unified coordinate system established for the detection auxiliary devices includes:

establishing the unified coordinate system for each of the detection auxiliary devices based on background calibration points of known three-dimensional data; or selecting a detection auxiliary device from all the detection auxiliary devices as a unified detection device, and establishing the unified coordinate system based on the unified detection device; or establishing the unified coordinate system for each of the detection auxiliary devices based on a positioning device.

In one embodiment, the establishing the unified coordinate system for each of the detection auxiliary devices based on a positioning device includes:

tracking a first position of a positioning identifier based on the positioning device, tracking a second position of the detection auxiliary device according to the first position, and establishing the unified coordinate system according to the second position, wherein the positioning identifier is disposed on the detection auxiliary device and used with the positioning device.

In a second aspect, embodiments of the present application provide an object surface data detection method, the method including:

obtaining a unified coordinate system established for detection auxiliary devices, wherein a number of the detection auxiliary devices is at least two;

respectively obtaining first scan data of scanning devices scanning a surface of an object and tracking results of the detection auxiliary devices tracking the scanning devices at the same time, wherein a number of the scanning devices is at least two and all the first scan data correspond to the scanning devices; and comprehensively calculating the tracking results, the first scan data obtained by the at least two scanning devices, and the unified coordinate system to obtain an object surface detection result.

In one embodiment, obtaining tracking results of the detection auxiliary devices tracking the scanning devices at the same time includes:

obtaining a scan area allocated to each of the scanning devices, and then obtaining detection auxiliary devices configured for each of the scanning devices, wherein a number of the detection auxiliary devices configured for each of the scanning devices depends on the allocated scan area; and tracking the scanning devices by the configured detection auxiliary devices to obtain the tracking results.

In one embodiment, the comprehensively calculating the tracking results, the first scan data obtained by the at least two scanning devices, and the unified coordinate system to obtain an object surface detection result includes:

distinguishing between the first scan data obtained by each of the scanning devices by using unique serial numbers corresponding to all the scanning devices;

identifying, according to the tracking results, the scanning device tracked by each of the detection auxiliary devices; and matching the detection auxiliary devices with the distinguished first scan data according to the identification results, and obtaining the object surface data detection result based on the matching results combined with the unified coordinate system.

In a third aspect, embodiments of the present application provide an object surface data detection system, the system including: a scanning device, detection auxiliary devices, and a control apparatus;

the control apparatus obtains a unified coordinate system established for the detection auxiliary devices, wherein a number of the detection auxiliary devices is at least two;

the control apparatus respectively obtains first scan data of the scanning device scanning a surface of an object, and tracking results of the detection auxiliary devices tracking the scanning device; and the control apparatus comprehensively calculates the tracking results, the first scan data, and the unified coordinate system to obtain an object surface data detection result.

In one embodiment, the control apparatus includes a first server and a second server;

the first server is connected to the detection auxiliary devices respectively and is used to track the scanning device in real time by the detection auxiliary devices to obtain the tracking results; and the second server is connected to the first server through a network and is used to obtain the first scan data and the tracking results, respectively, and then obtain the object surface data detection result.

In a fourth aspect, embodiments of the present application provide an object surface data detection system, characterized in that the system includes scanning devices, detection auxiliary devices, and a control apparatus;

the control apparatus obtains a unified coordinate system established for the detection auxiliary devices, wherein a number of the detection auxiliary devices is at least two;

the control apparatus respectively obtains first scan data of the scanning devices scanning a surface of an object and tracking results of the detection auxiliary devices tracking the scanning devices at the same time, wherein a number of the scanning devices is at least two and all the first scan data correspond to the scanning devices; and the control apparatus comprehensively calculates the tracking results, the first scan data obtained by the at least two scanning devices, and the unified coordinate system to obtain an object surface detection result.

In one embodiment, the scanning devices and/or the detection auxiliary devices are equipped on a mobile device, wherein the mobile device is used to move according to a pre-configured path.

In one embodiment, the object surface data detection system further includes a wearable device, wherein the wearable device is connected to the at least two scanning devices; or a number of the wearable devices is at least two, and each of the wearable devices is connected to the scanning device.

In a fifth aspect, embodiments of the present application provide an electronic apparatus including a memory, a processor, and a computer program stored on the memory and executable on the processor, wherein when the processor executes the computer program, the object surface data detection method as described in the first aspect and the second aspect is implemented.

In a sixth aspect, embodiments of the present application provide a storage medium that stores a computer program thereon, wherein when the program is executed by a processor, the object surface data detection method as described in the first aspect and the second aspect is implemented.

Compared with related technologies, the object surface data detection method and system, the electronic apparatus, and the storage medium provided in the embodiments of the present application are applied to a three-dimensional scanning system including detection auxiliary devices and a scanning device. By obtaining a unified coordinate system established for the detection auxiliary devices, wherein a number of the detection auxiliary devices is at least two; respectively obtaining first scan data of the scanning device scanning a surface of an object and tracking results of the detection auxiliary devices tracking the scanning device; and comprehensively calculating the tracking results, the first scan data, and the unified coordinate system to obtain an object surface detection result, the efficiency of detecting the surface of the object is improved, the problem of low accuracy of object surface data detection is solved, and high-efficiency and high-accuracy object surface data detection is achieved.

BRIEF DESCRIPTION OF THE DRAWINGS

The accompanying drawings described here are used for providing a further understanding of the present application and constitute a part of the present application. The schematic embodiments of the present application and the descriptions thereof are used for illustrating the present application and do not constitute improper limitations to the present application. Among the drawings.

DETAILED DESCRIPTION OF THE EMBODIMENTS

Figure 1:
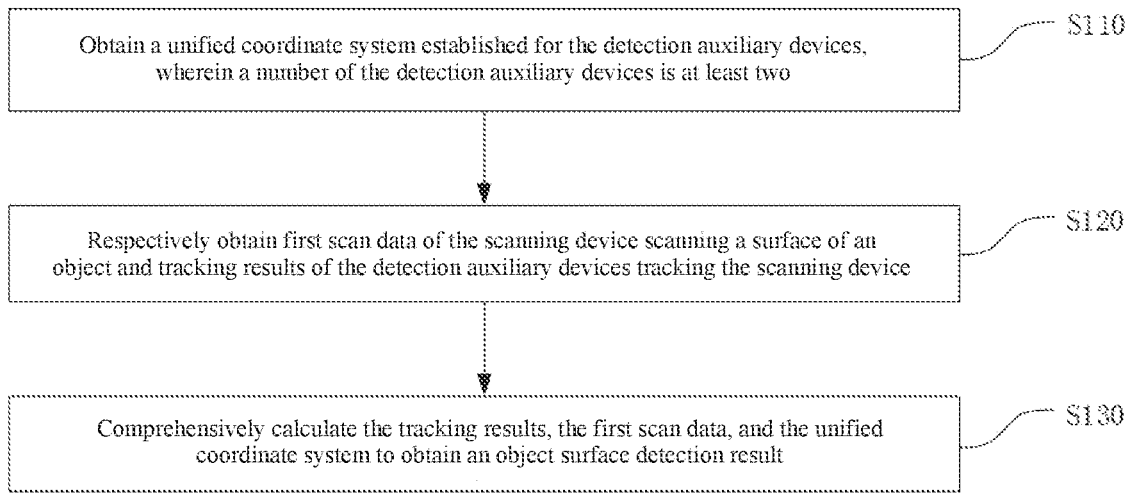
FIG. 1 is a flowchart of an object surface data detection method according to an embodiment of the present application.

In order to make the objectives, technical solutions, and advantages of the present application clearer, the present application is described and illustrated below with reference to the accompanying drawings and embodiments. It should be understood that the specific embodiments described herein are only used to explain the present application and are not used to limit the present application. Based on the embodiments provided in the present application, all other embodiments obtained by one of ordinary skill in the art without any creative effort shall fall within the scope of protection of the present application. In addition, it is also understandable that although the efforts made in this development process may be complicated and lengthy, some design, manufacturing, or production changes made based on the technical content disclosed in the present application are just conventional technical means for one of ordinary skill in the art related to the content disclosed in the present application, and should not be understood that the content disclosed in the present application is insufficient.

The "embodiment(s)" mentioned in the present application means that specific features, structures, or characteristics described in conjunction with the embodiment(s) may be included in at least one embodiment of the present application. This phrase appearing in various places of the description does not necessarily refer to the same embodiment, nor is an independent or alternative embodiment mutually exclusive with other embodiments. One of ordinary skill in the art explicitly and implicitly understands that the embodiments described in the present application can be combined with other embodiments where no conflict exists.

Unless otherwise defined, the technical terms or scientific terms involved in the present application shall have the ordinary meanings understood by one with general skills in the technical field to which the present application pertains. The terms such as "a", "an", "one", and "the" involved in the present application do not indicate a quantitative limit and may indicate a singular or plural number. The terms "include", "comprise", "have" and any variations thereof in the present application are intended to cover non-exclusive inclusion. For example, the processes, methods, systems, products, or devices including a series of steps or modules (units) are not limited to the listed steps or units, but may further include unlisted steps or units, or may further include other steps or units inherent to these processes, methods, products, or devices. The terms "connected", "linked", "coupled", and the like mentioned in the present application are not limited to physical or mechanical connections, but may include electrical connections, whether direct or indirect. The term "plurality" involved in the present application means more than or equal to two. The term "and/or" describes a relationship of associated objects, indicating three relationships. For example, A and/or B may indicate that A exists alone, A and B exist at the same time, and B exists alone. The terms "first", "second", "third", etc. involved in the present application merely distinguish between similar objects and do not represent a specific order for the objects.

This embodiment provides an object surface data detection method, which is applied to a three-dimensional scanning system including detection auxiliary devices and a scanning device. FIG. 1 is a flowchart of an object surface data detection method according to an embodiment of the application. As shown in FIG. 1, the method includes the following steps:

Step S110: a unified coordinate system established for the detection auxiliary devices is obtained, wherein the number of the detection auxiliary devices is at least two.

It should be noted that the at least two detection auxiliary devices are cascaded and used in the object surface data detection method, each detection auxiliary device is used to provide positioning for the scanning device, and the detection auxiliary devices may be binocular cameras, trackers, or other devices used for tracking and positioning; and the positioning devices are used to provide positioning for the detection auxiliary devices. Each detection auxiliary device and the scanning device may be an integrated device. For example, if a tracking scanner is used, each tracking head installed on the tracking scanner is the detection auxiliary device. The unified coordinate system may be established by a calibration process before the object surface data detection; and the unified coordinate system refers to a coordinate system that unifies tracking coordinate systems of all the detection auxiliary devices.

Step S120: first scan data of the scanning device scanning the surface of an object and tracking results of the detection auxiliary devices tracking the scanning device are obtained respectively.

Wireless connection and communication through a network, or wired connected through a USB or the like, may be established between the detection auxiliary devices and between each detection auxiliary device and the scanning device. Specifically, during the scanning process, the scanning device scans the surface of the object to obtain the first scan data, and all the detection auxiliary devices are used to track the position of the scanning device. The arrangement of each detection auxiliary device is related to the shape, size, and the like of the detected object. This arrangement follows the principle that when the scanning device scans the detected object, it is ensured that each detection auxiliary device can track the position of the scanning device. It can be understood that every two of all the detection auxiliary devices have an overlapping tracking field of view. The scanning device may be applied to a wearable device, which is easy for a user to carry.

Step S130: the tracking results, the first scan data, and the unified coordinate system are comprehensively calculated to obtain an object surface detection result.

The tracking results refer to the tracking statuses of the detection auxiliary devices with respect to the scanning device. For example, whether each detection auxiliary device obtains position information of the scanning device is determined in turn, and if it is determined that a certain detection auxiliary device has obtained the position information, the tracking result indicates that the detection auxiliary device has tracked the scanning device.

According to the tracking results, the first scan data can be converted to the tracking coordinate system of the detection auxiliary device that has tracked and positioned the scanning device, and then second scan data of the detection auxiliary device can be obtained. Specifically, the detection auxiliary device may obtain the position information of the scanning device during the tracking process. For example, the scanning device may be equipped with infrared reflective markers for identification by the detection auxiliary devices. The plurality of detection auxiliary devices obtain the current position of the scanning device in real time by tracking the reflective markers of the scanning device. The position of each detection auxiliary device may be obtained in advance. Then a positional relationship between the scanning device and each detection auxiliary device may be obtained through the current position of the scanning device and the position of the detection auxiliary device, and the coordinates of the first scan data of the scanning device are converted to the tracking coordinate system of each detection auxiliary device based on the positional relationship, to obtain second scan data in each tracking coordinate system. It should be noted that the second scan data may be frame data at the current time.

After the second scan data of the detection auxiliary devices are obtained, the second scan data may be processed by fusion or the like, or an optimal second scan data may be evaluated and selected according to a combined error of all the second scan data. Finally, the processed or selected first scan data is converted to the unified coordinate system to obtain the object surface data detection result.

In related technologies, scanning and object surface data detection are usually performed only for a single tracking device, so that the scanning range and scanning accuracy are limited, and large objects or scenes cannot be accurately scanned. However, in the above steps S110 to S130 of the embodiment of the present application, a unified coordinate system is established for each detection auxiliary device, first scan data in an area to be scanned is obtained by the scanning device, the detection auxiliary devices track the scanning device in real time, and then the first scan data is converted to the unified coordinate system to obtain an object surface data detection result, so that the cascade of a single scanning device and a plurality of tracking devices realizes high-efficiency and high-accuracy object surface data detection, effectively improves the accuracy of scan data in the object surface data detection process, improves the efficiency of detecting the surface of the object, and solves the problems of low efficiency and low accuracy of object surface data detection.

In one embodiment, the above step S130 further includes the following steps:

Step S132: in a case where the tracking results indicate that the number of tracked devices is at least two, an optimal device among all the tracking devices is selected based on a preset selection strategy, wherein the tracked devices refer to the detection auxiliary devices that have successfully tracked the scanning device.

Specifically, when the tracking results indicate that a plurality of detection auxiliary devices have tracked and positioned the scanning device at the same time, the detection auxiliary devices that have tracked the scanning device are regarded as tracked devices. At this time, the optimal device among all the detection auxiliary devices may be selected based on the preset selection strategy.

The preset selection strategy includes at least one of the following: a distance-based strategy, a stitching precision-based strategy, and a marker number-based strategy. For example, the preset selection strategy may be a distance-based strategy. In binocular measurement, the closer the device is, the higher the accuracy is. Therefore, when a plurality of detection auxiliary devices observe and track the scanning device, the detection auxiliary device closest to the scanning device may be selected as the optimal device. Alternatively, the preset selection strategy may also be a stitching precision-based strategy. When tracking the scanning device, each detection auxiliary device stitches the markers on the scanning device and obtains a stitching precision. The higher the stitching precision is, the better the effect is. Therefore, the detection auxiliary device with the highest stitching precision may be selected as the optimal device. Alternatively, the preset selection strategy may also be a marker number-based strategy. If each detection auxiliary device tracks more markers on the scanning device, the theoretical stability and effect are better. Therefore, the detection auxiliary device tracking the most markers may be selected as the optimal device. Alternatively, because each tracked device is a binocular tracking device, the binocular tracking device can be split into monocular cameras. Two possible monocular cameras are combined for three-dimensional reconstruction tracking and positioning, and the two combined monocular cameras with the highest accuracy are selected as the optimal device.

Step S134: the first scan data is converted to a tracking coordinate system of the optimal device to obtain the second scan data, and the second scan data is converted to the unified coordinate system to obtain the object surface detection result.

After the optimal device among all the detection auxiliary devices is selected, the first scan data of the optimal device is obtained for subsequent coordinate conversion on the first scan data of the optimal device. Specifically, the first scan data of the scanning device may be converted only to the tracking coordinate system of the optimal device to obtain the second scan data, that is, the optimal device is used as the detection auxiliary device currently used to track the scanning device, so as to ensure that the detection auxiliary device with the highest accuracy can always be selected for data detection during the scanning process. Alternatively, the second scan data of the optimal device may be obtained after the first scan data is converted to the tracking coordinate systems of all the detection auxiliary devices, and finally, based on the conversion relationship between the tracking coordinate system of the optimal device and the unified coordinate system, all the optimal second scan data are converted to the unified coordinate system to obtain the object surface detection result under the unified coordinate system.

Through steps S132 to S134 above, an optimal device among the detection auxiliary devices is selected through a preset selection strategy based on the tracking results, the first scan data of the optimal device is used as optimal scan data, and coordinate conversion is performed on the first scan data of the optimal device, which avoids the redundancy and large error of the scan data caused by the cascade of a plurality of detection auxiliary devices, thereby further improving the efficiency and accuracy of object surface data detection.

In one embodiment, in a case where the tracking results indicate that the number of the tracked devices is at least two, the object surface data detection method further includes the following steps:

Step S122: a weight value is assigned to each tracked device according to the positioning accuracy of each tracked device, wherein the positioning accuracy refers to an accuracy of tracking and positioning the scanning device by the tracked device.

Specifically, when the tracking results indicate that a plurality of detection auxiliary devices has tracked and positioned the scanning device at the same time, a corresponding weight value may be assigned to each tracked device according to the positioning accuracy of each tracked device. It should be noted that the positioning accuracy refers to an accuracy of tracking data obtained by each tracked device when tracking and positioning the scanning device. The positioning accuracy of the tracked device may be determined based on information such as the position of the scanning device within the tracking field of view of the tracked device.

For example, the weight value may be determined based on the position of the scanning device within the tracking field of view of the tracked device, that is, a lower weight value is assigned to a tracked device that detects that the scanning device is positioned at a peripheral region of the tracking field of view, and a higher weight value is assigned to a tracked device that detects that the scanning position is in a center region. Alternatively, the weight value may be determined according to the number of markers on the scanning device tracked by each tracked device, the brightness quality of the markers, and the angle quality of the markers. The more the markers are, the better the stability and accuracy of the tracked device are, and the better the accuracy of marker identification is under suitable marker brightness and angle. Therefore, the weight value of the tracked device with more markers and suitable marker brightness and angle can be set to be higher. Alternatively, a binocular tracking device may be split to obtain monocular cameras, and two possible monocular cameras are combined for three-dimensional reconstruction tracking and positioning. The distance between the two monocular cameras can be used as a basis for judgment. If the distance is longer, the accuracy of the combined monocular cameras is theoretically higher, so the weight value can be determined based on the distance.

Step S124: the first scan data is converted to a tracking coordinate system of each tracked device, to obtain frame scan data corresponding to the tracked device.

After the tracked devices are currently determined, the first scan data obtained by the scanning device can be converted to the respective tracking coordinate systems of all the tracked devices. It should be noted that the frame scan data refers to scan data of a current frame in the tracking coordinate system. The tracking results of whether all the detection auxiliary devices can track the scanning device are obtained in real time, and the tracking state of each detection auxiliary device with respect to the scanning device during the scanning process may change at any time. Therefore, only the frame scan data of the current frame obtained by the tracked devices can be stitched or fused based on the tracking results, thereby avoiding object surface data detection result errors caused by sudden changes in the tracking state of the tracked devices currently determined.

Step S126: all the frame scan data are fused based on the weight values to obtain fused second scan data, thus obtaining the object surface detection result.

Specifically, a weight value corresponding to each detection auxiliary device can be obtained through step S122 above, and the frame scan data of the detection auxiliary devices are weighted and averaged or the like by using the weight values, as shown in formula 1:

$$Date1 = \frac{W_0}{W_0 + W_1 + \ldots + W_n} F_0 + \frac{W_1}{W_0 + W_1 + \ldots + W_n} F_1 + \ldots + \frac{W_n}{W_0 + W_1 + \ldots + W_n} F_n \quad \text{formula 1}$$

where, Date1 represents first scan data; $W_0, W_1, \ldots, W_n$ represent weight values corresponding to the respective detection auxiliary devices, that is, the detection auxiliary device 0 to the detection auxiliary device n; $F_0, F_1, \ldots, F_m$ represent frame scan data corresponding to the detection auxiliary device 0 to the detection auxiliary device n; and n is a positive integer. Based on the weighted calculation of formula 1 above, finally the frame scan data can be fused to obtain the second scan data.

Through steps S122 to S126 above, when a plurality of tracked devices have tracked and positioned the scanning device, a weight value is determined for each tracked device, and the scan data under the tracking coordinate systems of all the tracked devices are fused by means of a weighted average algorithm or the like based on the weight values, thereby realizing data fusion that can average errors and effectively improves the accuracy of object surface data detection.

In one embodiment, step S130 above further includes the following step: in a case where the tracking results indicate that the number of tracked devices is one, the first scan data is converted to the tracking coordinate system of the tracked device to obtain the first scan data.

If currently only one detection auxiliary device has tracked and positioned the scanning device, the unique detection auxiliary device can be selected as the tracked device, and the first scan data of the scanning device can be converted to the tracking coordinate system of the tracked device, so as to subsequently convert the second scan data in the tracking coordinate system to the unified coordinate system, to finally obtain the object surface data detection result. Therefore, the coordinate conversion based on the unique tracked device avoids redundant calculations caused by data processing on all detection auxiliary devices, effectively improving the efficiency of the object surface data detection method.

In one embodiment, the obtaining tracking results of the detection auxiliary devices tracking the scanning device further includes the following step: in a case where the tracking results indicate that the number of tracked devices is zero and at most one monocular camera in each detection auxiliary device has tracked the scanning device, the respective monocular cameras are combined to re-obtain the tracking results.

Specifically, the detection auxiliary devices are all binocular camera devices, and a situation exists where at least one of the two cameras on all the binocular camera devices fails to capture the scanning device during the tracking and positioning process. Then each binocular camera may be split to obtain monocular cameras, and every two of all the monocular cameras are combined for three-dimensional reconstruction, tracking and positioning of the scanning device. It should be noted that the above combination method may be as follows: all the auxiliary detection devices are calibrated when step S102 above is executed to establish a unified coordinate system, position information of each auxiliary detection device is obtained, and then every two closer monocular cameras are selected in turn from all the monocular cameras for combination. Because the field of view of the binocular camera is smaller than that of the monocular cameras, the above method of splitting the binocular tracking device and combining the monocular cameras can avoid failing in tracking and positioning the scanning device in the presence of a blind spot due to too small a tracking field of view of the binocular camera, thereby effectively improving the error tolerance rate of the object surface data detection method.

Through the above embodiments, the number of tracked devices is extended to one or zero, and different object surface data detection methods are provided for different situations, so that the detection auxiliary devices can adaptively execute different processing schemes under different tracking situations, which increases the diversified functions of object surface data detection.

In one embodiment, step S110 above further includes the following step: the unified coordinate system is established for each of the detection auxiliary devices based on background calibration points of known three-dimensional data; or a detection auxiliary device is selected from among all the detection auxiliary devices as a unified detection device, and the unified coordinate system is established based on the unified detection device; or the unified coordinate system is established for each detection auxiliary device based on a positioning device.

Specifically, taking the establishment of the unified coordinate system based on background calibration points for example, the background calibration points may be measured by a photogrammetric device, a laser tracker, or other high-accuracy global positioning devices. The unified coordinate system is established based on the background calibration points without calibrating the conversion relationship between the detection auxiliary devices, the tracking data obtained by all the detection auxiliary devices are fused into the unified coordinate system established based on the background calibration points, and the detection auxiliary devices may move dynamically during scanning to track the background calibration points in real time.

The background calibration points may be pasted on the object, or a fixture may be installed around the object and markers such as mark symbols are pasted on the fixture as identifiers. After the arrangement of the background calibration points is completed, first coordinates of these background calibration points can be captured by the above-mentioned photogrammetric device or the like. Meanwhile, the background calibration points may also be used as markers of the detection auxiliary devices. Then each detection auxiliary device may track the background calibration points in real time to obtain second coordinates in the tracking coordinate system, and then a conversion relationship from each tracking coordinate system to the unified coordinate system is calculated based on the first coordinates and the second coordinates, finally establishing the unified coordinate system. Through the above embodiment, the photogrammetric device is used as a positioning device to obtain background calibration points, and the unified coordinate system is established based on the background calibration points, so that unified conversion of coordinates from the tracking coordinate systems of the plurality of detection auxiliary devices to the unified coordinate system can be achieved by the same type of markers. Further, the same type of background calibration points can be deployed on site according to the actual situation, so that the deployment of the object surface data detection system is easier and faster, and the use cost is also reduced.

Alternatively, taking the establishment of a unified coordinate system based on a unified detection device for example, the unified detection device is selected from among all the detection auxiliary devices, and the unified coordinate system is established based on the unified detection device. The unified detection device may be randomly selected from among the detection auxiliary devices, and the tracking coordinate system of the unified detection device is used as the unified coordinate system, so that the first scan data in the respective tracking coordinate systems of the other detection auxiliary devices can all be converted to the unified coordinate system, which simplifies the steps of unified coordinate conversion, reduces the amount of calculation for establishing the unified coordinate system, and helps improve the efficiency of object surface data detection.

Alternatively, taking the establishment of a unified coordinate system based on a positioning device for example, a conversion relationship between each detection auxiliary device and the positioning device may be obtained according to a first identifier and a second identifier on a calibration object, and then the unified coordinate system is established based on the conversion relationship, wherein the first identifier is used with the positioning device, and the second identifier is used with the detection auxiliary device. It should be noted that the positioning device is used to provide positioning for the detection auxiliary device. The positioning device may be a binocular camera, an optical tracking system (OTS), a laser tracker, or other global positioning devices.

The first identifier and the second identifier are used to represent symbols of different attributes for marking, that is, the positioning device tracks the position of the first identifier, and each detection auxiliary device tracks the position of the second identifier. The calibration object may be a calibration board such as a Charuco board, or the calibration object may also be other objects and scenes with markers. Taking a rigid calibration board as an example of the calibration object, a positional relationship between the two types of markers on the rigid calibration board can be measured in advance by a global photogrammetric device, that is, the positions of the first identifier and the second identifier can be captured by the photogrammetric device, and then the positional relationship between the first identifier and the second identifier can be obtained. Alternatively, the positional relationship may also be ensured by machining, that is, when the rigid calibration board is made, the machining technician processes the rigid calibration board according to the preset positional relationship between the first identifier and the second identifier. Through the positional relationship between the two types of markers, the conversion relationship between each detection auxiliary device and the positioning device can be obtained, the unified coordinate system can be established based on the conversion relationship, and finally the first scan data in the tracking coordinate system can be uniformly converted to the global coordinate system, that is, the global coordinate system of the positioning device is used as the unified coordinate system for coordinate unification of all the first scan data.

For example, the positional relationship between the first identifier and the second identifier may be captured by the photogrammetric device or other devices, or the positional relationship may also be ensured by methods such as machining. Because the installation positions of the first identifier and the second identifier are different, the position of first coordinates of the first identifier in the global coordinate system can be converted to the same position as the position of second coordinates of the second identifier in the tracking coordinate system based on the positional relationship. Alternatively, the position of the second coordinates may also be converted to the same position as the position of the first coordinates based on the positional relationship, so as to unify the positions of the first coordinates and the second coordinates. After the first coordinates and the second coordinates are converted to a unified position, the constraint relationship between the first coordinates and the second coordinates can be determined by the conversion relationship between respective different coordinate systems. The constraint relationship can be represented by formula 2:

$$a = R \times b + T \quad \text{formula 2}$$

where a represents a point set of the first coordinates in the global coordinate system, b represents a point set of the second coordinates converted to the same position in the tracking coordinate system, R represents a three-dimensional rotation matrix, and T represents a one-dimensional translation vector. After the constraint relationship represented by formula 1 between the two point sets a and b is known, a conversion relationship RT can be calculated through algorithms such as singular value decomposition, and the unified coordinate system can be established based on the conversion relationship RT.

Through the above embodiment, the conversion relationship between each detection auxiliary device and the positioning device is obtained according to the two types of identifiers on the calibration object, which is beneficial to improving the accuracy and efficiency of establishing a unified coordinate system, so that unified conversion of coordinates of the plurality of detection auxiliary devices can be implemented efficiently and accurately based on the unified coordinate system, and then object surface data can be detected, thereby further improving the accuracy and efficiency of the scan data in the object surface data detection process.

In one embodiment, step S110 above further includes the following step:

A first position of a positioning identifier is tracked based on the positioning device, a second position of the detection auxiliary device is tracked according to the first position, and the unified coordinate system is established according to the second position, wherein the positioning identifier is disposed on the detection auxiliary device and used with the positioning device.

Specifically, a plurality of positioning identifiers may be respectively installed on each detection auxiliary device. The coordinates of the positioning identifiers, that is, the first positions, are tracked by the positioning device. Then the positioning device can track the second positions of the detection auxiliary devices provided with the positioning identifiers to establish the unified coordinate system. The positioning identifiers may be laser target balls. Through the above embodiment, the unified coordinate system is established by the positioning identifiers disposed on the detection auxiliary devices, which can simplify the deployed components for establishing the unified coordinate system in the object surface data detection method, is then more suitable for the solution of configuring the detection auxiliary devices on the mobile device, and effectively improves the convenience of the object surface data detection method.

Figure 2:
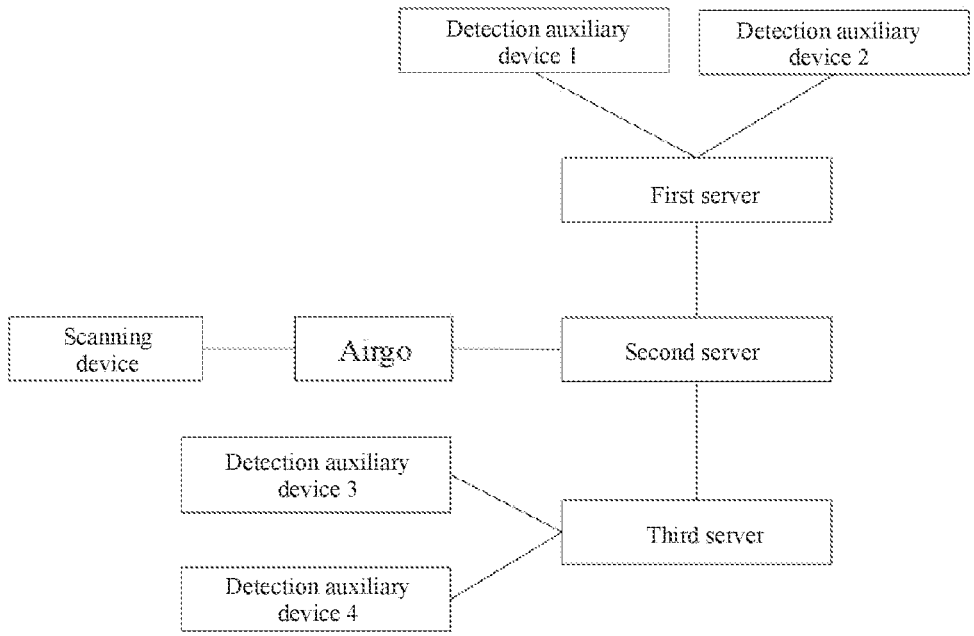
FIG. 2 is a schematic diagram of an object surface data detection architecture according to an embodiment of the present application.

Next an embodiment of the present application is described in detail with reference to an actual application scene. FIG. 2 is a schematic diagram of an object surface data detection architecture according to an embodiment of the present application. As shown in FIG. 2, in this architecture, the wearable device is Airgo, which is connected to a scanning device and a second server, respectively. The second server is connected to a first server and a third server, respectively, wherein the first server is connected to a detection auxiliary device 1 and a detection auxiliary device 2, respectively, and the third server is connected to a detection auxiliary device 3 and a detection auxiliary device 4, respectively. In actual applications, the second server may receive coordinate system information of each detection auxiliary device through the first server and the third server, and establish a unified coordinate system. Then during the scanning process, the first server receives tracking results of the detection auxiliary device 1 and the detection auxiliary device 2 with regard to the scanning device respectively, and sends the tracking results to the second server. Similarly, the second server receives tracking results corresponding to the detection auxiliary device 3 and the detection auxiliary device 4, which are sent by the third server. The second server receives first scan data of the scanning device through Airgo, converts the first scan data to tracking coordinate systems of the detection auxiliary devices based on the tracking results to obtain first scan data, and converts the first scan data to the unified coordinate system to obtain second scan data, thus finally obtaining an object surface data detection result.

Figure 3:
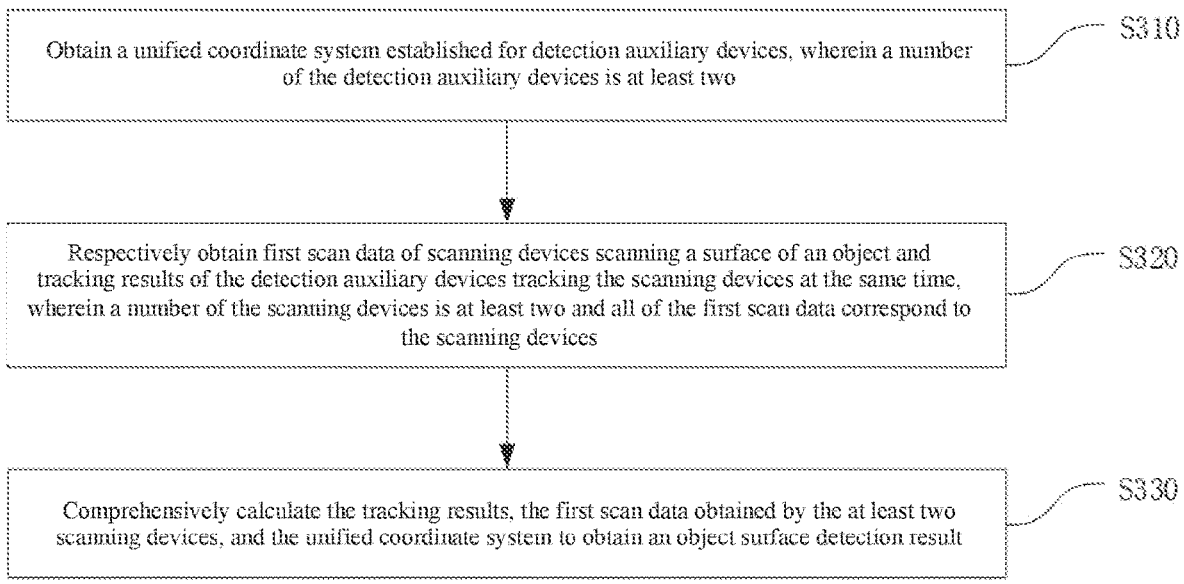
FIG. 3 is a flowchart of another object surface data detection method according to an embodiment of the present application.

This embodiment further provides an object surface data detection method. FIG. 3 is a flowchart of another object surface data detection method according to an embodiment of the present application. As shown in FIG. 3, the method includes the following steps:

Step S310: a unified coordinate system established for detection auxiliary devices is obtained, wherein the number of the detection auxiliary devices is at least two.

Step S320: first scan data of scanning devices scanning the surface of an object and tracking results of the detection auxiliary devices tracking the scanning devices at the same time are obtained, respectively, wherein the number of the scanning devices is at least two, and all the first scan data correspond to the scanning devices.

Wireless connection and communication through a network, or wired connected through a USB or the like, may be established between the detection auxiliary devices, between the scanning devices, and between each detection auxiliary device and each scanning device. The embodiment of the present application can be applied to an actual scene where a plurality of scanning devices are used. Specifically, the scanning devices can simultaneously scan the object or scene to be detected in an area to be scanned, and all the detection auxiliary devices operate at the same time to track the scanning devices. It is understandable that the arrangement of each detection auxiliary device can be related to the shape or size of the object to be detected, and all the scanning devices can divide the area to be scanned. Further, because the detection auxiliary devices are deployed at different positions on site and their detecting and tracking fields of view are different, the tracking result of each detection auxiliary device with regard to each scanning device is also different.

Step S330: the tracking results, the first scan data obtained by the at least two scanning devices, and the unified coordinate system are comprehensively calculated to obtain an object surface detection result.

The tracking result of each detection auxiliary device with regard to each scanning device may be different. For example, the detection auxiliary device 1 tracks and positions the scanning device 3, and the detection auxiliary device 2 tracks and positions the scanning device 1 and the scanning device 2. By processing the tracking result of each of the above detection auxiliary devices, the first scan data of the scanning device positioned by each detection auxiliary device is converted to the corresponding tracking coordinate system to obtain second scan data, and finally all the second scan data are converted to the unified coordinate system to obtain the object surface data detection result.

Through steps S310 to S330 above, a plurality of detection auxiliary devices track a plurality of scanning devices at the same time, and then the first scan data of all the scanning devices are uniformly processed, so as to realize object surface data detection application based on a plurality of scanning devices and a plurality of detection auxiliary devices, to further extend the area to be scanned, and to extend the trackable fields of view of the auxiliary detection devices, thereby effectively improving the accuracy of object surface data detection.

In one embodiment, the obtaining tracking results of the detection auxiliary devices tracking the scanning devices at the same time includes the following steps:

Step S322: a scan area allocated to each scanning device is obtained, and then detection auxiliary devices configured for each scanning device are obtained, wherein the number of detection auxiliary devices configured for each scanning device depends on the allocated scan area.

For example, the scanning devices include a scanning device 1 and a scanning device 2, and the scan area of the scanning device 1 for scanning the surface of an object is different from that of the scanning device 2. The detection auxiliary devices include a detection auxiliary device 1 to a detection auxiliary device 4. All the detection auxiliary devices are divided into two types and allocated to the scanning devices, that is, the scanning device 1 is tracked by the detection auxiliary device 1 and the detection auxiliary device 2, and the scanning device 2 is tracked by the detection auxiliary device 3 and the detection auxiliary device 4.

Step S324: the scanning devices are tracked by the configured detection auxiliary devices to obtain the tracking results.

For example, after step S322 above is performed, the detection auxiliary device 1 and the detection auxiliary device 2 only track the position of the scanning device 1, the detection auxiliary device 3 and the detection auxiliary device 4 only track the position of the scanning device 2, and finally respective tracking results of the detection auxiliary devices are obtained. The first scan data obtained through scanning by the scanning device 1 is converted to the tracking coordinate system of the detection auxiliary device 1 or the detection auxiliary device 2 and is finally converted to the unified coordinate system of the detection auxiliary device 1 to the detection auxiliary device 4. Similarly, the data obtained through scanning by the scanning device 2 is converted to the tracking coordinate system of the detection auxiliary device 3 or the detection auxiliary device 4 and is finally converted to the unified coordinate system to achieve data fusion.

Through steps S322 to S324 above, each single scanning device and at least two detection auxiliary devices constitute a cascade unit, first scan data in the tracking coordinate system of each detection auxiliary device are obtained by individual cascade units, and finally the coordinates of the first scan data obtained by a plurality of cascade units are converted to the unified coordinate system, thereby realizing quick and accurate processing of unified coordinates of the first scan data based on the individual cascade units, and effectively improving the efficiency of the object surface data detection method in the application scene of a plurality of scanning devices and a plurality of detection auxiliary devices.

In one embodiment, step S330 above further includes the following steps:

Step S332: the first scan data obtained through scanning by each scanning device is distinguished by using unique serial numbers corresponding to all the scanning devices.

Each scanning device is provided with a corresponding unique serial number. Based on the unique serial number, each scanning device can be associated with all the obtained first scan data. For example, the scanning device 1 obtains a piece of first scan data, i.e., data 1, and the scanning device 2 obtains another piece of first scan data, i.e., data 2. A server receives the data 1 and the data 2 at the same time, and each piece of data received carries its own unique serial number. Then it can be identified that the data 1 is the first scan data obtained by the scanning device 1, and the data 2 is the first scan data obtained by the scanning device 2.

Step S334: the scanning device tracked by each detection auxiliary device is identified according to the tracking results.

The tracking result of each detection auxiliary device for each scanning device may be different. For example, the detection auxiliary device 1 tracks and positions the scanning device 2, and the detection auxiliary device 2 tracks and positions the scanning device 1. Based on the analysis and processing of the tracking result of each detection auxiliary device, the scanning device tracked and positioned by each detection auxiliary device can be identified.

Step S336: the detection auxiliary devices are matched with the distinguished first scan data according to the identification results, and the object surface data detection result is obtained based on the matching results and the unified coordinate system.

After the identification results are obtained, the detection auxiliary devices are associated with the identified scanning devices. For example, the identification results show that the detection auxiliary device 1 has tracked and positioned the scanning device 2, and the detection auxiliary device 2 has tracked and positioned the scanning device 1. Then the detection auxiliary device 1 is associated with the scanning device 2, and the detection auxiliary device 2 is associated with the scanning device 1. Meanwhile, through step S332 above, the first scan data obtained by all the scanning devices can be distinguished to obtain data scanning results of the scanning devices. For example, the first scan data obtained by the scanning device 1 is data 1, and the first scan data obtained by the scanning device 2 is data 2. Then based on the above identification results, the detection auxiliary device 1 can be matched with the first scan data of the scanning device 2, i.e., data 2, and the detection auxiliary device 2 can be matched with the data 1. After the matching is completed, coordinate conversion is performed on the first scan data matched with the detection auxiliary devices, and finally the first scan data is converted to the unified coordinate system to obtain the object surface data detection result.

Through steps S332 to S336 above, the detection auxiliary devices are matched with the first scan data based on the unique serial numbers corresponding to the scanning devices, to obtain the object surface data detection result, thereby realizing quick and accurate distinction between the first scan data obtained by the plurality of scanning devices, and further improving the efficiency and accuracy of the object surface data detection method.

It can be understood that steps S310 to S330 and steps S322 to S324 above can also be used to implement the above embodiments and alternative embodiments. For example, the scanning device 1, the detection auxiliary device 1, and the detection auxiliary device 2 constitute a small cascade unit, and the scanning device 2, the detection auxiliary device 3, and the detection auxiliary device 4 constitute a small cascade unit. In the respective small cascade units, the first scan data of each detection auxiliary device can be obtained through steps S202 to S204. What has been described will not be repeated.

Figure 4:
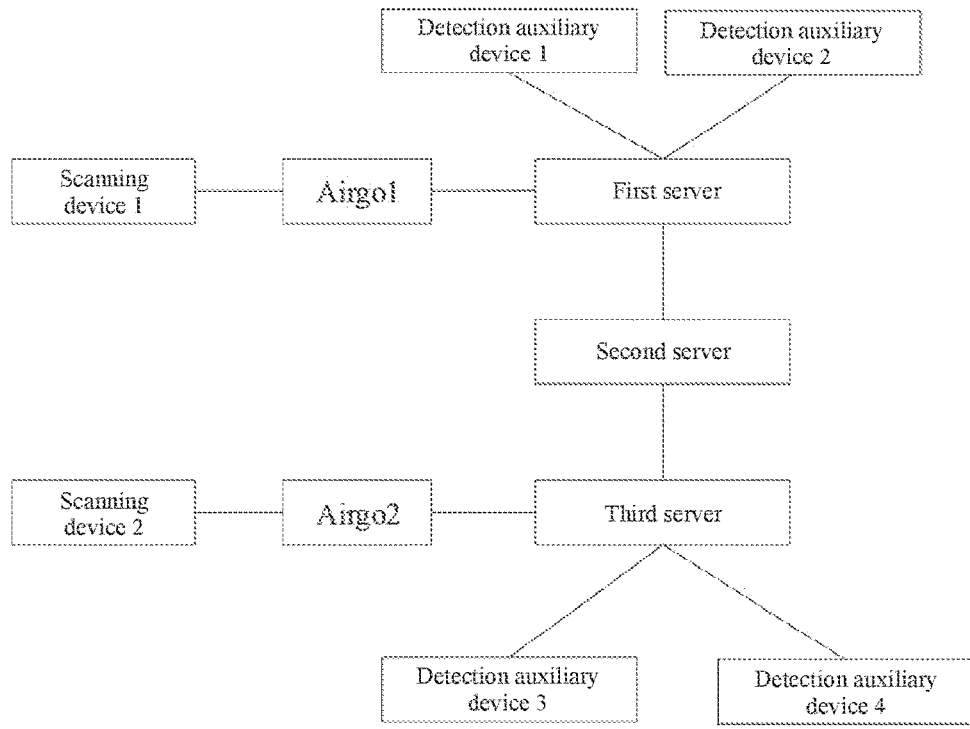
FIG. 4 is a schematic diagram of another object surface data detection architecture according to an embodiment of the present application.

Next, an embodiment of the present application will be described in detail with reference to an actual application scene. FIG. 4 is a schematic diagram of another object surface data detection architecture according to an embodiment of the present application. As shown in FIG. 4, the wearable devices are Airgo1 and Airgo2 in this architecture. The Airgo1 is connected to a scanning device 1 and a first server, respectively. The first server is connected to a detection auxiliary device 1, a detection auxiliary device 2, and a second server, respectively. The Airgo2 is connected to a scanning device 2 and a third server, respectively. The third server is connected to a detection auxiliary device 3, a detection auxiliary device 4, and the second server. In actual applications, the second server may receive coordinate system information of each detection auxiliary device through the first server and the third server and establish a unified coordinate system. Then during the scanning process, the first server receives tracking results of the detection auxiliary device 1 and the detection auxiliary device 2 with regard to the scanning device, respectively, and sends the tracking results to the second server. Similarly, the second server receives tracking results corresponding to the detection auxiliary device 3 and the detection auxiliary device 4, which are sent by the third server. The second server further receives first scan data of the scanning device 1 through the first server and first scan data of the scanning device 2 through the third server. The second server converts the first scan data to tracking coordinate systems of the detection auxiliary devices based on the tracking results to obtain first scan data, and converts the first scan data to the unified coordinate system to obtain second scan data, thus finally obtaining an object surface data detection result.

It should be noted that the steps shown in the above process or in the flowchart of the drawing can be executed in a computer system of a set of computer-executable instructions, and although a logical sequence is shown in the flowchart, the steps shown or described can be performed in a different order than here in some cases.

Figure 5:
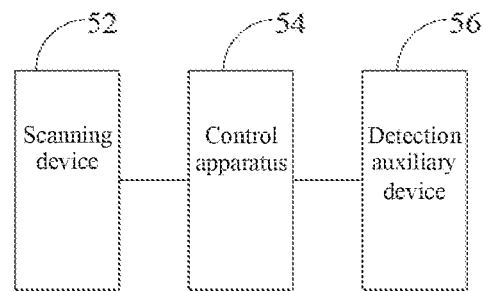
FIG. 5 is a structural block diagram of an object surface data detection system according to an embodiment of the present application.

This embodiment further provides an object surface data detection system. FIG. 5 is a structural block diagram of an object surface data detection system according to an embodiment of the present application. As shown in FIG. 5, the system includes a scanning device 52, detection auxiliary devices 56, and a control apparatus 54.

The control apparatus 54 obtains a unified coordinate system established for the detection auxiliary devices 56, wherein the number of the detection auxiliary devices 56 is at least two. The control apparatus 54 respectively obtains first scan data of the scanning device 52 scanning the surface of an object and tracking results of the detection auxiliary devices 56 tracking the scanning device. The control apparatus 54 comprehensively calculates the tracking results, the first scan data obtained by the at least two scanning devices, and the unified coordinate system to obtain an object surface data detection result.

Through the above embodiment, the control apparatus 54 establishes a unified coordinate system for each detection auxiliary device. The scanning device 52 obtains first scan data in an area to be scanned. The detection auxiliary devices 56 track the scanning device in real time. Then the first scan data is converted to the unified coordinate system to obtain an object surface data detection result. Thus, the cascade of a single scanning device and a plurality of tracking devices realizes high-efficiency and high-accuracy object surface data detection, effectively improves the accuracy of scan data in the object surface data detection process, improves the efficiency of detecting the surface of the object, and solves the problem of low accuracy of object surface data detection.

In one embodiment, the control apparatus 54 includes a first server and a second server. The first server is connected to the detection auxiliary devices 56, respectively, and is configured to track the scanning device 52 in real time through the detection auxiliary devices 56 to obtain the tracking results. The second server is connected to the scanning device and the first server, respectively, through a network, and is configured to obtain the first scan data and the tracking results, respectively, and then obtain the object surface data detection result, wherein the second server may also be connected to the scanning device 52 by connecting a wearable device.

Reference can be made to FIG. 2 and FIG. 4 for the two connection modes between the servers and the devices. The coordinate conversion and fusion processing on the scan data based on different servers can effectively reduce the amount of transmission between the servers and improve the computing efficiency. Moreover, through the servers that connect the detection auxiliary devices 56, the moving range of each detection auxiliary device 56 is extended, thereby extending the tracking area of the detection auxiliary devices 56.

This embodiment further provides an object surface data detection system. The system includes scanning devices 52, detection auxiliary devices 56, and a control apparatus 54.

The control apparatus 54 obtains a unified coordinate system established for the detection auxiliary devices 56, wherein the number of the detection auxiliary devices 56 is at least two. The control apparatus 54 respectively obtains first scan data of the scanning devices 52 scanning the surface of an object and tracking results of the detection auxiliary devices 56 tracking the scanning devices 52 at the same time, wherein the number of the scanning devices 52 is at least two. All the first scan data correspond to the scanning devices 52. The control apparatus 54 comprehensively calculates the tracking results, the first scan data obtained by the at least two scanning devices 52, and the unified coordinate system to obtain an object surface detection result.

Through the above embodiment, a plurality of detection auxiliary devices 56 track a plurality of scanning devices 52 at the same time. Then the first scan data of all the scanning devices 52 are uniformly processed, so as to realize object surface data detection application based on a plurality of scanning devices 52 and a plurality of detection auxiliary devices 56, further extend the area to be scanned, extend the trackable fields of view of the auxiliary detection devices 56, and effectively improve the accuracy of object surface data detection.

In one embodiment, the scanning devices 52 and/or the detection auxiliary devices 56 are equipped on a mobile device, wherein the mobile device is configured to move according to a pre-configured path. It should be noted that one or more scanning devices 52 may be equipped on the mobile device. Similarly, one or more detection auxiliary devices 56 may be equipped on the mobile device.

Figure 6:
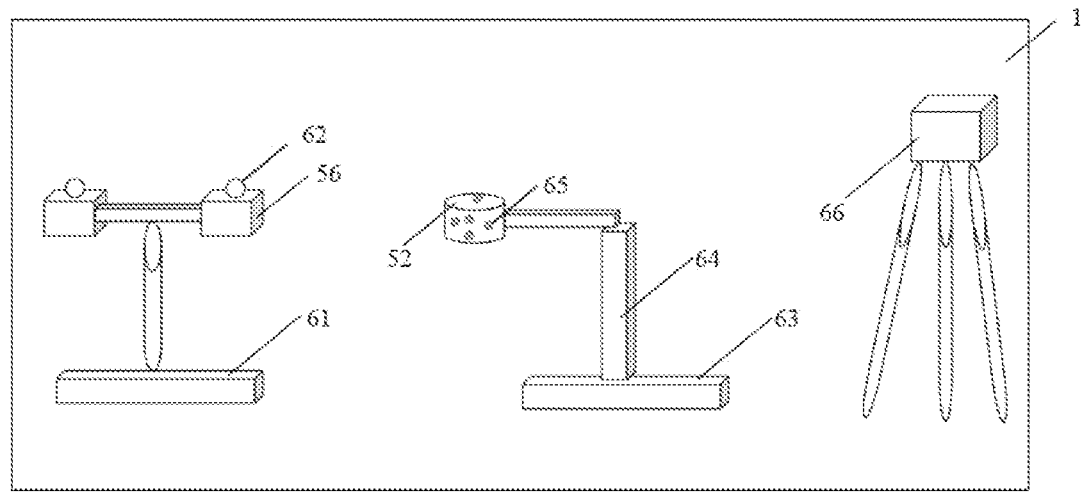
FIG. 6 is a schematic diagram of an application scene of an object surface data detection system according to an embodiment of the present application.

The detection auxiliary device 56 is provided with a first identifier, and the scanning device 52 is provided with a second identifier. An Automated Guided Vehicle (AGV) is taken as an example of the mobile device. FIG. 6 is a schematic diagram of an application scene of an object surface data detection system according to an embodiment of the present application. As shown in FIG. 6, two AGVs are placed in an application scene 1. The left AGV 61 is equipped with two detection auxiliary devices 56, each detection auxiliary device 56 being provided with a first identifier 62. The right AGV 63 is fixedly equipped with a mechanical portion 64. A single scanning device 52 is installed on the mechanical portion 64, and the scanning device 52 is provided with a second identifier 65. A positioning device 66 is further placed in the application scene 1. During the establishment of a unified coordinate system, the positioning device 66 tracks and positions the corresponding detection auxiliary device 56 through each first identifier 62. Based on the position of each detection auxiliary device 56, the tracking coordinate system of each detection auxiliary device 56 is converted to a global coordinate system of the positioning device 66 to determine a unified coordinate system. Then during the scanning process, the scanning device 52 obtains first scan data. Each detection auxiliary device 56 tracks and positions the scanning device 52 through the second identifier 65. The first scan data is converted to the respective tracking coordinate systems based on the position of the scanning device 52 and is finally converted to the unified coordinate system, to unify the coordinates of all the first scan data.

Figure 7:
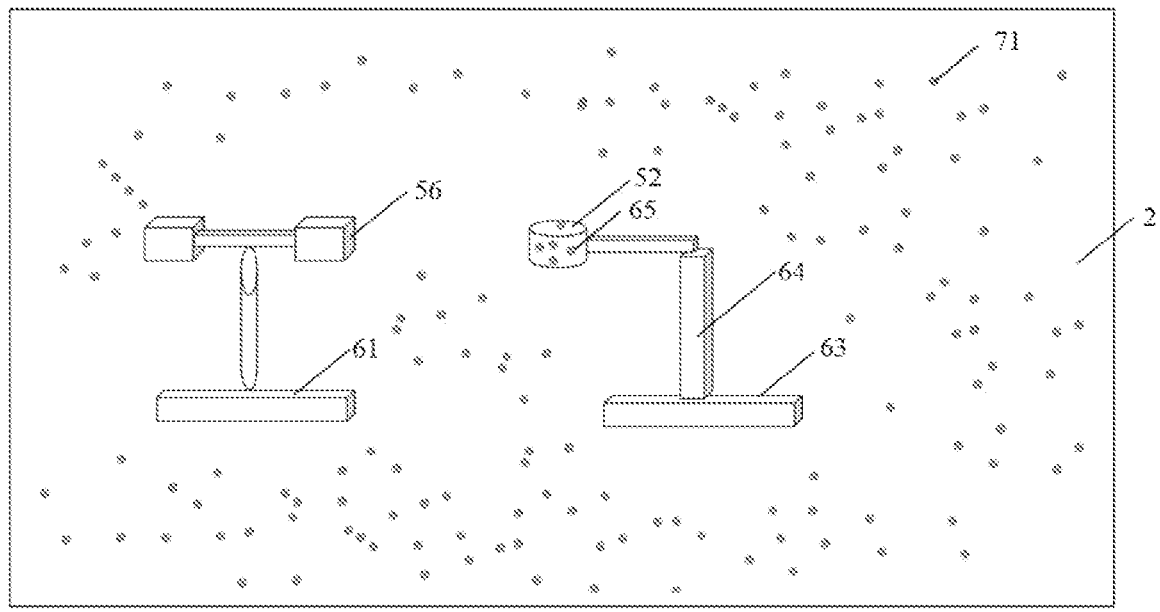
FIG. 7 is a schematic diagram of an application scene of another object surface data detection system according to an embodiment of the present application.

Alternatively, background calibration points are disposed in the area to be scanned, and the second identifier is disposed on the scanning device 52. FIG. 7 is a schematic diagram of an application scene of another object surface data detection system according to an embodiment of the present application. As shown in FIG. 7, two AGVs are placed in an application scene 2. The left AGV 61 is equipped with two detection auxiliary devices 56. The right AGV 63 is fixedly equipped with a mechanical portion 64. A single scanning device 52 is installed on the mechanical portion 64, and the scanning device 52 is provided with a second identifier 65. Further, a plurality of background calibration points 71 are distributed in the application scene 2. The background calibration points 71 can be captured in advance by a global photogrammetric device or the like to determine coordinates. Then a unified coordinate system can be determined through the background calibration points 71.

Through the above embodiment, the detection auxiliary devices 56 and the scanning device 52 are deployed on at least one mobile device, so that the detection auxiliary devices 56 and the scanning device 52 can move freely during the scanning process, thereby realizing a more flexible and convenient object surface data detection method and a larger range of scanning based on the mobile device.

In one embodiment, the object surface data detection system further includes a wearable device, wherein the wearable device is connected to the at least two scanning devices 52. Alternatively, the number of the wearable devices 52 is at least two, and each wearable device is connected to the scanning device 52. Reference can be made to FIG. 4 for one of the connection modes of each scanning device 52 applied to the wearable device. Through the above embodiment, a wearable device to which the scanning devices 52 can be applied is added to the object surface data detection system, which is easy for a user to carry, improves the convenience of object surface data detection, and further extends the scanning range.

Figure 8:
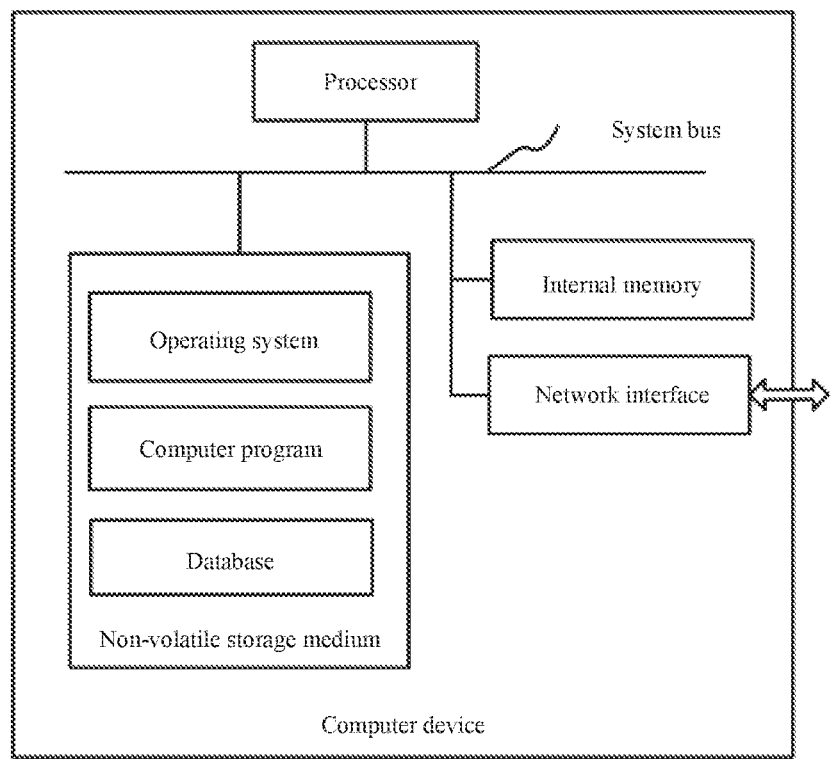
FIG. 8 is an internal structure diagram of a computer device according to an embodiment of the present application.

This embodiment further provides a computer device. The computer device may be a server. FIG. 8 is an internal structure diagram of a computer device according to an embodiment of the present application. As shown in FIG. 8, the computer device includes a processor, a memory, a network interface, and a database that are connected by a system bus. The processor of the computer device is configured to provide calculation and control capabilities. The memory of the computer device includes a non-volatile storage medium and an internal memory. The non-volatile storage medium stores an operating system, a computer program and a database. The internal memory provides an environment for the operation of the operating system and the computer program in the non-volatile storage medium. The database of the computer device is configured to store a unified coordinate system. The network interface of the computer device is configured to communicate with an external terminal through network connection. The computer program is executed by the processor to implement an object surface data detection method.

One skilled in the art can understand that the configuration shown in FIG. 8 is only a block diagram of a partial configuration related to the solution of the present application and does not constitute a limitation on the computer device to which the solution of the present application is applied. The specific computer device may include more or fewer parts than shown in the figure, or combine some parts, or have a different arrangement of the parts.

This embodiment further provides an electronic apparatus, including a memory and a processor. The memory stores a computer program. The processor is configured to run the computer program to execute the steps in any of the foregoing method embodiments.

Optionally, the electronic apparatus may further include a transmission device and an input/output device, wherein the transmission device is connected to the processor, and the input/output device is connected to the processor.

Optionally, in this embodiment, the processor may be configured to execute the following steps through the computer program:

S1: a unified coordinate system established for detection auxiliary devices is obtained, wherein the number of the detection auxiliary devices is at least two.

S2: first scan data of a scanning device scanning the surface of an object and tracking results of the detection auxiliary devices tracking the scanning device are obtained, respectively.

S3: the tracking results, the first scan data, and the unified coordinate system are comprehensively calculated to obtain an object surface detection result.

It should be noted that, for the specific examples in this embodiment, reference may be made to the examples described in the above embodiments and alternative embodiments, and this embodiment will not be repeated here.

In addition, in combination with the object surface data detection method in the foregoing embodiments, an embodiment of the present application may provide a storage medium for implementation. The storage medium stores a computer program. When the computer program is executed by a processor, any one of the object surface data detection methods in the foregoing embodiments is implemented.

One of ordinary skill in the art can understand that all or part of the processes in the methods of the foregoing embodiments can be implemented by a computer program instructing relevant hardware. The computer program may be stored in a non-volatile computer-readable storage medium. The computer program, when executed, may include the processes of the embodiments of the above methods. Any reference to the memory, storage, database or other media used in the embodiments provided in the present application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration and not a limitation, the RAM is available in many forms, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

One skilled in the art should understand that the technical features of the above embodiments may be combined arbitrarily. For the purpose of simplicity in description, all possible combinations of the technical features in the above embodiments are not described. However, as long as the combinations of these technical features do not represent contradictions, they shall fall within the scope of this specification.

The above-mentioned embodiments only describe several implementations of the present application. The descriptions thereof are specific and detailed but cannot thereby be construed as limitations to the patent scope of the present application. It should be noted that one of ordinary skill in the art may further make variations and improvements without departing from the concept of the present application, and these all fall within the protection scope of the present application. Therefore, the patent protection scope of the present application should be subject to the appended claims.

The invention claimed is:

1. An object surface data detection method, applied to a three-dimensional scanning system comprising at least two detection auxiliary devices and a scanning device, the method comprising:
   obtaining a unified coordinate system established for the detection auxiliary devices;
   obtaining first scan data of the scanning device scanning a surface of an object and tracking results of the detection auxiliary devices tracking the scanning device; and
   obtaining an object surface detection result based on the tracking results, the first scan data, and the unified coordinate system.

2. The object surface data detection method according to claim 1, wherein the obtaining the object surface detection result comprises:
   in a case where the tracking results indicate that a number of tracked devices is at least two, selecting an optimal device from the tracked devices based on a preset selection strategy, wherein the tracked devices comprise the detection auxiliary devices that have successfully tracked the scanning device; and
   converting the first scan data to a tracking coordinate system of the optimal device to obtain second scan data, and converting the second scan data to the unified coordinate system to obtain the object surface detection result.

3. The object surface data detection method according to claim 2, wherein the preset selection strategy comprises at least one of: a distance-based strategy, a stitching precision-based strategy, and a marker number-based strategy.

4. The object surface data detection method according to claim 2, wherein in the case where the tracking results indicate that a number of tracked devices is at least two, the method further comprises:
   assigning a weight value to each of the tracked devices according to a positioning accuracy of each of the tracked devices, wherein the positioning accuracy comprises an accuracy of tracking and positioning the scanning device by the tracked device;
   converting the first scan data to a tracking coordinate system of each of the tracked devices, to obtain frame scan data corresponding to each of the tracked device; and
   fusing the frame scan data based on the weight values to obtain fused second scan data, thus obtaining the object surface detection result.

5. The object surface data detection method according to claim 1, wherein the obtaining the object surface detection result comprises:
   in a case where the tracking results indicate that a number of tracked devices is one, converting the first scan data to a tracking coordinate system of the tracked device to obtain second scan data, and converting the second scan data to the unified coordinate system to obtain the object surface detection result.

6. The object surface data detection method according to claim 1, wherein the obtaining the tracking results of the detection auxiliary devices tracking the scanning device comprises:
   in a case where the tracking results indicate that a number of tracked devices is zero and at most one monocular camera in each of the detection auxiliary devices has tracked the scanning device, combining the monocular cameras in all of the detection auxiliary devices to re-obtain the tracking results.

7. The object surface data detection method according to claim 1, wherein the obtaining the unified coordinate system established for the detection auxiliary devices comprises:
   establishing the unified coordinate system for each of the detection auxiliary devices based on background calibration points of known three-dimensional data;
   selecting a detection auxiliary device from the detection auxiliary devices as a unified detection device, and establishing the unified coordinate system based on the unified detection device; or
   establishing the unified coordinate system for each of the detection auxiliary devices based on a positioning device.

8. The object surface data detection method according to claim 7, wherein the establishing the unified coordinate system for each of the detection auxiliary devices based on a positioning device comprises:

tracking a first position of a positioning identifier using the positioning device, tracking a second position of the detection auxiliary device according to the first position, and establishing the unified coordinate system according to the second position, wherein the positioning identifier is disposed on the detection auxiliary device and used with the positioning device.

9. The object surface data detection method according to claim 1, wherein the detection auxiliary devices are cascaded.

10. The object surface data detection method according to claim 1, wherein the detection auxiliary devices comprise a binocular camera or a tracker.

11. The object surface data detection method according to claim 1, wherein the detection auxiliary devices and the scanning device are connected wirelessly.

12. The object surface data detection method according to claim 1, wherein each two of the detection auxiliary devices have an overlapping tracking field of view.

13. An object surface data detection method, comprising:

obtaining a unified coordinate system established for at least two detection auxiliary devices;

obtaining first scan data of at least two scanning devices scanning a surface of an object and tracking results of the detection auxiliary devices tracking the scanning devices at a same time, wherein the first scan data correspond to the scanning devices; and obtaining an object surface detection result based on the tracking results, the first scan data, and the unified coordinate system.

14. The object surface data detection method according to claim 13, wherein the obtaining the tracking results of the detection auxiliary devices tracking the scanning devices at the same time comprises:

obtaining a scan area allocated to each of the scanning devices, and obtaining detection auxiliary devices configured for each of the scanning devices, wherein a number of the detection auxiliary devices configured for each of the scanning devices depends on the allocated scan area; and tracking the scanning devices by the configured detection auxiliary devices to obtain the tracking results.

15. The object surface data detection method according to claim 13, wherein the obtaining the object surface detection result comprises:

distinguishing the first scan data by using unique serial numbers corresponding to all of the scanning devices;

identifying, according to the tracking results, the scanning device tracked by each of the detection auxiliary devices; and matching the detection auxiliary devices with the distinguished first scan data according to the identification results, and obtaining the object surface data detection result based on the matching results and the unified coordinate system.

16. The object surface data detection method according to claim 13, wherein the detection auxiliary devices are cascaded.

17. The object surface data detection method according to claim 13, wherein the detection auxiliary devices comprise a binocular camera or a tracker.

18. The object surface data detection method according to claim 13, wherein the detection auxiliary devices and the scanning devices are connected wirelessly.

19. The object surface data detection method according to claim 13, wherein each two of the detection auxiliary devices have an overlapping tracking field of view.

20. An object surface data detection system, comprising: a scanning device; at least two detection auxiliary devices; and a control apparatus, wherein:

the control apparatus obtains a unified coordinate system established for the detection auxiliary devices;

the control apparatus obtains first scan data of the scanning device scanning a surface of an object and tracking results of the detection auxiliary devices tracking the scanning device; and the control apparatus obtains an object surface detection result based on the tracking results, the first scan data, and the unified coordinate system.

21. The object surface data detection system according to claim 20, wherein:

the control apparatus comprises a first server and a second server;

the first server is connected to the detection auxiliary devices and is configured to track the scanning device in real time through the detection auxiliary devices to obtain the tracking results; and the second server is connected to the scanning device and the first server through a network and is configured to obtain the first scan data and the tracking results and obtain the object surface data detection result.

22. The object surface data detection system according to claim 20, wherein the detection auxiliary devices are cascaded.

23. The object surface data detection system according to claim 20, wherein the detection auxiliary devices and the scanning device are connected wirelessly.

24. The object surface data detection system according to claim 20, wherein each two of the detection auxiliary devices have an overlapping tracking field of view.

25. An object surface data detection system, comprising: two scanning devices; at least two detection auxiliary devices; and a control apparatus, wherein:

the control apparatus obtains a unified coordinate system established for the detection auxiliary devices;

the control apparatus obtains first scan data of the scanning devices scanning a surface of an object and tracking results of the detection auxiliary devices tracking the scanning devices at the same time, wherein the first scan data correspond to the scanning devices; and the control apparatus obtains an object surface detection result based on the tracking results, the first scan data, and the unified coordinate system.

26. The object surface data detection system according to claim 25, further comprising a mobile device, wherein the scanning devices or the detection auxiliary devices are installed on the mobile device, and wherein the mobile device is configured to move according to a pre-configured path.

27. The object surface data detection system according to claim 25, further comprising a wearable device, wherein the wearable device is connected to at least one of the scanning devices.

28. The object surface data detection system according to claim 25, wherein the detection auxiliary devices are cascaded.

29. The object surface data detection system according to claim 25, wherein the detection auxiliary devices and the scanning devices are connected wirelessly.

30. The object surface data detection system according to claim 25, wherein each two of the detection auxiliary devices have an overlapping tracking field of view.

\* \* \* \* \*